UNITED STATES PATENT OFFICE.

N. A. DAVIS, OF SUTTON, NEW HAMPSHIRE.

IMPROVEMENT IN HARROWS.

Specification forming part of Letters Patent No. 53,792, dated April 10, 1866.

*To all whom it may concern:*

Be it known that I, N. A. DAVIS, of Sutton, Merrimack county, and State of New Hampshire, have invented a new and Improved Finishing Seed-Harrow to Operate as a Harrow or Horse-Rake; and I do hereby declare the following to be an exact description thereof, reference being had to the accompanying drawings, and to the letters of reference marked thereon, making a part of this specification.

The nature of my invention consists in suspending the cultivator-head in front of the carriage-wheels so as to vibrate laterally, and be raised or lowered with ease by main levers to any required height by attaching the rake head or frame to ropes, straps, or chains connected with the shafts of the carriage and the main levers; also, the manner of fastening the teeth to the rake-head and guards from the rake-head to shafts.

Figure 1 represents a side elevation; Fig. 2, a top view; Fig. 3, shape of tooth.

A represents the carriage-wheels; B, the carriage-axle; C, the shafts; D, the cultivator or rake head suspended in front of the carriage-wheels by means of flexible supports E E, that are made of leather, rope, chains, or any material. The supports or straps E are attached to the shafts near to their ends, and also fastened to the rake-head D and the ends of levers G G. These levers G are connected by a cross piece or handle, H, by which the operator raises or lowers the cultivator to any required height or depth below the surface of the ground, and in the operation of raking to unload the rake when filled; and when the operator, who occupies the seat J, desires to keep the teeth I closer into the ground for harrowing purposes or cleaner raking, he presses his foot upon the treadle K and regulates the operation of the teeth.

The levers G work on a pivot, L, on each side of the shafts C, and the standards M, that connect the shafts to the carriage-axle, can be made of any required height, so that the cultivator or rake-head can be raised to any proper height for raking and unloading the rake. The brace N also strengthens the connection between the shafts C and carriage-axle B.

The guards P are made of any material, and are attached to each end of the rake-head D and near to the front end of shafts, so that in passing a stump, or tree, or fence-corner the rake-head will, by its lateral motion, be prevented from coming in contact with any obstruction on either side of the cultivator, as the guard P presses against the obstruction and moves the rake-head aside until the obstruction is passed.

The arms R of the teeth I are bent at right angles at top, (as shown at Fig. 3 at R,) and are fitted into a slot, T, in the rake-head, that braces them firmly, keeping them in a perfectly straight line and preventing them from moving or springing to either side, and the slot in which the spiral spring S operates allows them to spring up and down, and also braces them on both sides, and prevents any swaying of the teeth to either side, the slot being a vertical one, and the spring S operating on top of the tooth, between the tooth and top of the slot, so that the tooth may pass over a stone or obstruction safely.

What I claim as my invention, and desire to secure by Letters Patent, is—

1. Suspending the cultivator head or rake in front of the carriage-wheels by means of flexible supports, so as to allow the vibration of the head laterally, and allow the same to be raised or lowered by the levers G G to any required height to regulate the operation of the teeth.

2. The flexible guards P, attached to the outer end of the cultivator-head D, and reaching forward to near the front ends of the shafts C, for the purpose of guarding the head from contact with stones, stumps, trees, &c., as herein specified.

3. The manner of fastening the teeth I to the cultivator or rake head D by means of the arm R, secured in the slot T, to prevent the lateral swaying of the teeth, as specified, and, in combination therewith, the spiral spring S, arranged and operating as set forth.

4. Suspending a cultivator head or rake by means of flexible supports in front of the wheels, and operating the same by means of a lever or levers from the driver's seat, as and for the purpose specified.

N. A. DAVIS.

Witnesses:
J. FRANKLIN REIGART,
G. A. SAGE.